United States Patent [19]
Toth et al.

[11] 3,755,616
[45] Aug. 28, 1973

[54] THERMOPLASTIC SEALED-SHEATH COVERING UPON ELECTRICAL BUS-BAR CONDUCTORS

[75] Inventors: Julius Toth, Beaver; Edward M. Walker, Industry, both of Pa.

[73] Assignee: Westinghouse Electric Corporation, Pittsburgh, Pa.

[22] Filed: Sept. 15, 1971

[21] Appl. No.: 180,872

Related U.S. Application Data
[63] Continuation of Ser. No. 888,296, Dec. 29, 1969, abandoned.

[52] U.S. Cl.... 174/120 SR, 174/DIG. 8, 174/110 R
[51] Int. Cl. ............................................. H01b 7/02
[58] Field of Search .................. 174/110 R, DIG. 8, 174/68 B, 120 R, 120 SR; 117/114 R, 48, 66

[56] References Cited
UNITED STATES PATENTS
| | | | |
|---|---|---|---|
| R10, 344 | 6/1883 | Steward | 174/110 R |
| 2,027,962 | 1/1936 | Currie | 174/DIG. 8 |
| 2,043,796 | 6/1936 | Frank | 174/68 B |
| 3,086,888 | 4/1963 | Stratton | 174/110 R |
| 3,345,455 | 10/1967 | Goody | 174/110 R |
| 3,417,176 | 12/1968 | Anderson | 174/DIG. 8 |

FOREIGN PATENTS OR APPLICATIONS
| | | | |
|---|---|---|---|
| 883,155 | 11/1961 | Great Britain | 174/DIG. 8 |

OTHER PUBLICATIONS
Alphlex Shrinkable Tubing Ad. Brochure, pg. 1–2.

*Primary Examiner*—E. A. Goldberg
*Attorney*—A. T. Stratton, W. R. Crout et al.

[57] ABSTRACT

An improved and relatively inexpensive electrical conductor, such as a bus-bar, or feeder conductor, of aluminum or copper, for example, is provided with a thermoplastic elongated tubular sheath, or sheath tubing, such as polyvinyl chloride heat-reactive tubing of resinous material, having the ends of the sheath, or tubing, sealed, in a water-tight fashion to the bus-bar by a thermoplastic resinous tape material. In one method of the invention, the resinous tape may be wound adjacent the outer ends of the bus-bar at spaced areas thereon, and the thermoplastic tubing subsequently pulled, as a second operation, upon the bus-bar and heat shrunk into place over the aforesaid spaced taped areas.

Another alternate method for sealing the thermoplastic sheath tubing to the bus-bar, is to heat-shrink the thermoplastic insulating tubing, or "boot" upon the bus-bar after pulling it into place, scalp excess tubing to a specified dimension upon the bus-bar, and then band or tape each of the scalped ends of the tubing, or "boot" with a suitable thermoplastic resinous tape material, such, for example, as polyvinyl chloride adhesive tape.

5 Claims, 11 Drawing Figures

POLYVINYL CHLORIDE ADHESIVE TAPE
WITH A TOP OVERLAY OF "PLIOFILM"
TRANSPARENT TAPE.

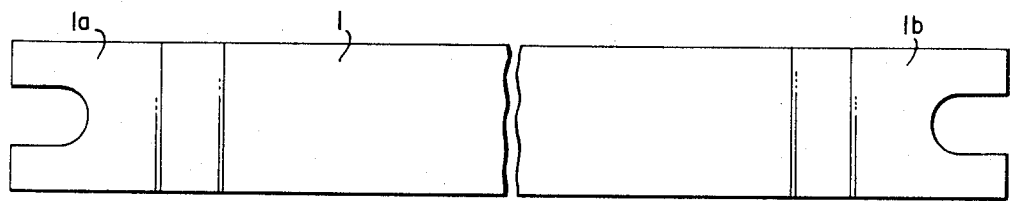
FIG.1.
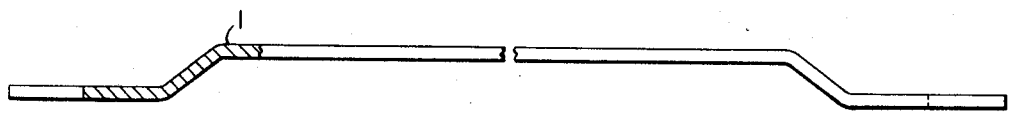
FIG.2.
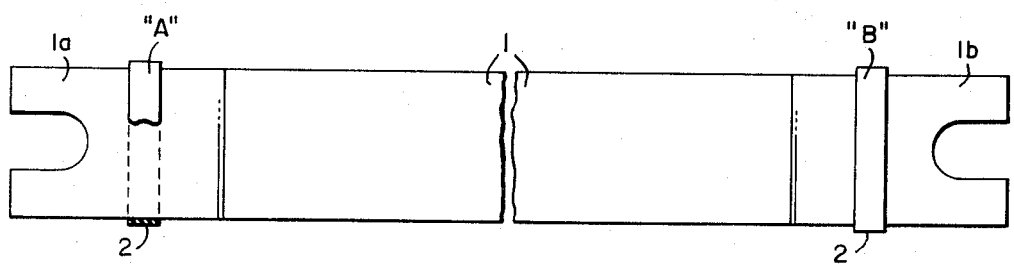
FIG.3.
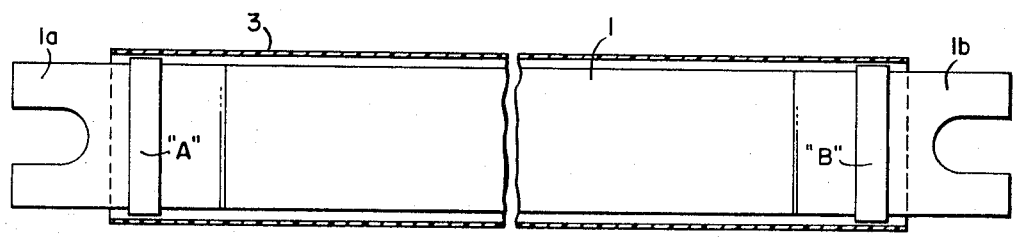
FIG.4.
AFTER HEAT SHRUNK INTO PLACE
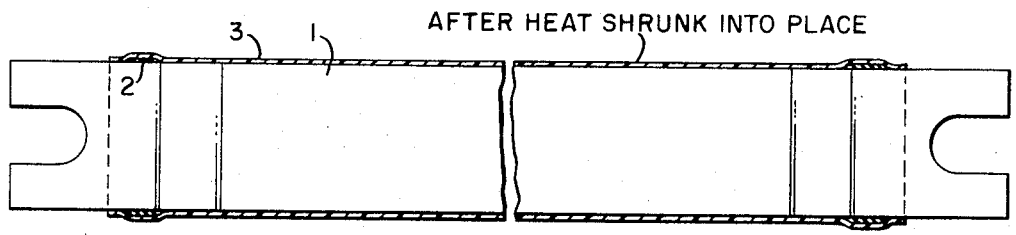
FIG.4A.
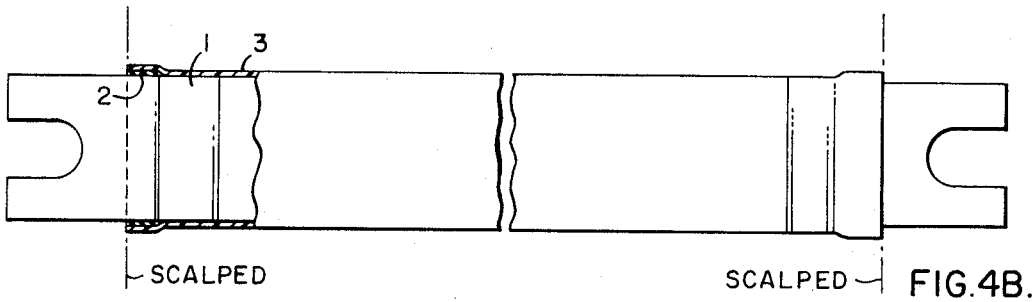
SCALPED    SCALPED    FIG.4B.

POLYVINYL CHLORIDE ADHESIVE TAPE
WITH A TOP OVERLAY OF "PLIOFILM"
TRANSPARENT TAPE.

THERMOPLASTIC SEALED-SHEATH COVERING UPON ELECTRICAL BUS-BAR CONDUCTORS

CROSS-REFERENCES TO RELATED APPLICATIONS

This application is a continuation application of our parent application Ser. No. 888,296, filed Dec. 29, 1969, now abandoned and assigned to the assignee of the present application.

BACKGROUND OF THE INVENTION

It has been customary in the past to wind insulating tape over bus-bars in switchgear applications. Reference may be made to U.S. Pat. No. 3,042,890, issued July 3, 1962, D. H. Gamble et al., and to U.S. Pat. No. 2,946,034, issued July 19, 1960, Washburn. The winding of such insulating tape, or the use of insulating tubes over the bus-bars, insures thereby that a very high-dielectric-strength insulating material must be penetrated, before flashover to adjacent grounded parts may ensue. Reference may be made to the insulating sleeve 22 set forth in U.S. Pat. No. 2,865,980, issued Dec. 23, 1958, Popovich et al., and to U.S. Pat. No. 2,653,991, issued Sept. 29, 1953, Dyer et al. with particular reference being directed to FIG. 6 of the last-mentioned patent. Consequently, the prior art has dictated the desirability of using insulating material upon bus-bar conductors for assisting in withstanding the line-to-ground voltage.

Reference may be made to U.S. Pat. No. 3,347,975, issued Oct. 17, 1967 to B. M. Shannon, and also to U.S. Pat. No. 3,178,668 issued Apr. 13, 1965 to C. L. Weimer et al., all showing an insulating covering. In addition, reference may be made to U.S. Pat. No. 3,148,312, issued Dec. 8, 1964 - S. S. Fouse.

It is well known by those skilled in the art, in plating processes, that is is customary to dip the bus-bar into several tank solutions, even approaching 12 in number. As a typical example, one of the tank solutions will contain a cleaning solution, followed by other tanks sequentially containing water rinse solution, a dilute nitric acid solution, a water rinse, an immersion zinc solution, two separate water rinse tanks, a copper plating solution, a water rinse solution, a silver plating solution, followed by two separate final water rinse tanks. As a result, the number of tanks employed, in this instance, is 12 in number.

As will be obvious, it is desirable for certain applications to limit the extent or area of the silver-plating coating upon the bus-bar, since silver is a very expensive material costing roughly $25.00 per pound. If the insulating tubing is allowed to have a loose fit upon the bus-bar, or electrical conductor, the solutions in the various tanks will tend to creep into the annular space between the interior of the tubing and the outer face of the bus-bar thereby causing undesirable deformation and deterioration of the tubing, and also blistering, or deterioration of the tubing. In addition, there is a loss of the plating solutions and corrosive damage to the metallic bus-bar.

SUMMARY OF THE INVENTION

In accordance with a preferred embodiment of the present invention, the extent or area of silver plating upon a bus-bar, such as a copper or aluminum bus-bar, is limited by providing a sealed water-tight and chemical-resistant sheath coating upon the bus-bar itself for a considerable portion of its length, and to thereby limit the silver electroplating to the end portions only of the bus-bar, where the bolted connections to other bus-bars, or adjoining connector elements, may take place, as well known by those skilled in the art.

In accordance with preferred methods of the present invention, a thermoplastic resinous material, such as a polyvinyl chloride adhesive tape is wound or taped upon the bus-bar at spaced locations adjacent its ends. The thermoplastic tubing, or "boot" is then positioned into place by pulling it on over the spaced taped portions, and it is then heat-shrunk upon the bus-bar, thereby creating a tight fit thereon. An alternate method for sealing the same tubing or thermoplastic sheath to the bus-bar, ends would be to heat-shrink the thermoplastic insulating tubing upon the bus-bar, as a first operation, scalp, or trim excess tubing to a specified dimension, and then band each of the outer scalped ends of the "boot" with the same polyvinyl chloride adhesive tape.

Further advantages may readily be perceived by those skilled in the art upon reading the following specification, taken in conjunction with the drawings.

BRIEF DESCRIPTION OF THE DRAWINGS

FIG. 1 is a view of a bus-bar prior to the process steps of the instant invention;

FIG. 2 is a side view of the bus-bar of FIG. 1;

FIG. 3 illustrates the taping of the spaced adhesive bands to the bus-bar of FIG. 1 as spaced-apart locations;

FIG. 4 illustrates the positioning, or pulling of the thermoplastic preformed tubing over the previously taped bus-bar to heat-shrink the same into place;

FIG. 4A illustrates the tube after shrinking.

FIG. 4B illustrates the final "scalping" operation;

DESCRIPTION OF THE PREFERRED METHODS AND ARTICLE EMBODIMENTS

Figure 5:
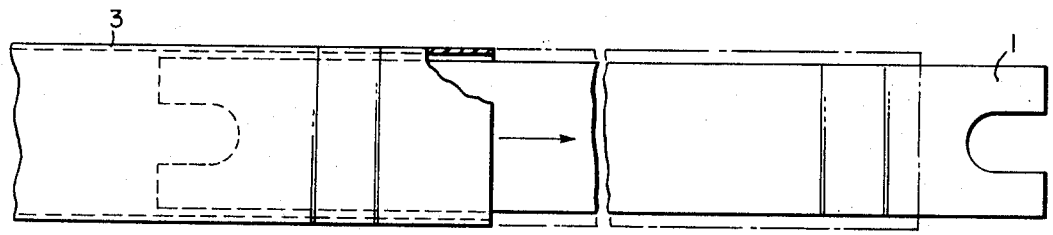
FIG. 5 illustrates the pulling of a preformed thermoplastic resinous tubing, or "boot" over the bus-bar.
Figure 6:
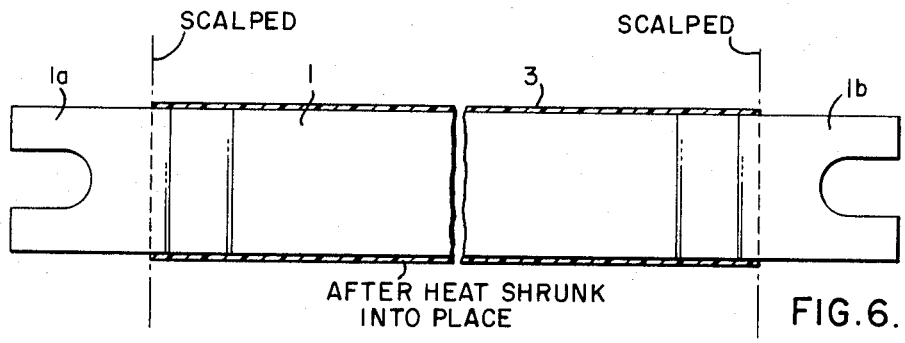
FIG. 6 illustrates the scalping operation following the heat shrinking of the thermoplastic "boot" over the bus-bar of FIG. 5.

Referring to the drawings, and more particularly to FIG. 1 thereof, the reference numeral 1 illustrates an electrical conductor, such as a bus-bar, commonly used in the fabrication of switchgear constructions. Reference may be made to U.S. Pat. No. 3,444,311 for a typical bus-duct installation in equipment, such as used extensively in the electrical industry.

It has been customary in the past to silver-plate bus-bars, or bus-duct sections, and to use, in this connection, considerable quantities of the metal silver in the plating solutions. The present invention is particularly concerned with minimizing the quantity of silver used in the plating of bus-bar connectors for certain applications. It is, consequently desirable, in employing the methods of the present invention, to provide a water-tight preformed insulating sheath, or "booth," which is slipped over the copper or aluminum bus-bar and having the outer ends thereof sealed, in water-tight relation, to the bus-bar surface for preventing any corrosive solution liquids, in the plating steps, from penetrating between the insulating tubing, or "boot" and the bus-bar surface during the plating process. In addition, it is desirable to eliminate liquid plating-solution drag-out contamination by the bus-bar from tank to tank.

According to the present invention, it is proposed, as illustrated in FIG. 3, to tape spaced portions of the bus-bar 1 with a suitable thermoplastic resinous tape material, such as polyvinyl chloride adhesive tape at locations "A" and "B." As a subsequent operation, as illustrated in FIG. 4, the preformed thermoplastic insulating tubing 3 is positioned, or pulled over the spaced taped portions "A" and "B" of the bus-bar 1, and heat shrunk into place, at say, a temperature around 300°F. This provides a sealed watertight construction at the ends "A," "B" of the polyvinyl chloride tubing 3.

The excess tubing is then scalped, or trimmed to a specified dimension, as illustrated in FIG. 4A.

Figure 7:
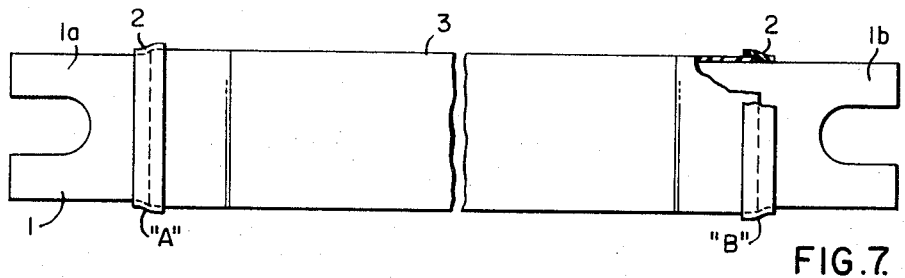
FIG. 7 illustrates the taping of the ends of the shrunk "boot" to form a secure adherence therebetween.
Figure 8:
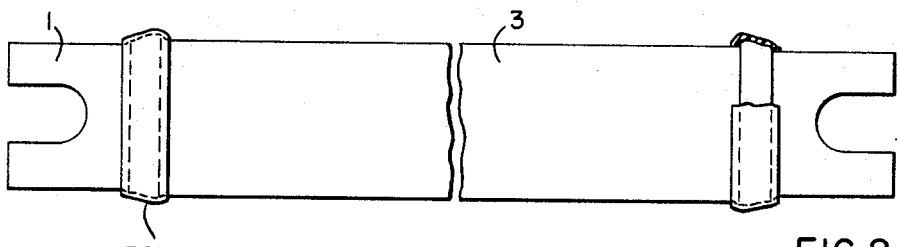
FIG. 8 illustrates the covering of the polyvinyl chloride adhesive tape with a top overlay of "Pliofilm" transparent tape which facilitates handling of the taped bus-bar and preventing smearing of the plastic polyvinyl chloride adhesive tape; and, FIG. 9 diagrammatically illustrates the several tank vats utilized in a conventional plating process, such as silver plating, wherein the plating rack is carrying a plurality of the bus-bars of the present invention from tank to tank in the plating procedures.

A second method of providing the desirable results of the present invention, and to eliminate the excess use of the metal silver in the plating solution steps, is to position the preformed thermoplastic tubing material 3 over the bus-bar 1, as, for example, polyvinyl chloride tubing, as illustrated in FIG. 5, and as a subsequent process step, band or tape the ends of the preformed polyvinyl tubing 3 with a suitable thermoplastic resinous tape material 2, such as, preferably, polyvinyl chloride adhesive tape, such as illustrated in FIG. 7.

"Pliofilm" a registered trademark is a rubber hydrochloride in the form of transparent sheets or rolls 0.001 inch thick. It is resistant to moisture, water, oils, greases and most solvents; is heat sealable; and is very flexible. It is manufactured by the Goodyear Tire and Rubber Company and sold under the aforesaid trade name. It is a rubber derivative resembling resins.

The Polyvinyl chloride adhesive tape is supplied with a "Pliofilm" backing attached to one side only. The use of "Pliofilm" as a backing over the polyvinyl chloride tape enables it to be handled easily during assembly, and prevents the polyvinyl chloride tape from smearing or physically sticking to extraneous articles during the manufacturing steps.

The thermoplastic insulating preformed tubing or "boot" is a flexible, prestressed, heat reactive tubing and is supplied by the Minnesota Mining and Manufacturing Company under the trade name designation of Scotchtite 105C. The physical specifications of this tubing is covered under Westinghouse PDS 44791AG.

An alternate insulating preformed tubing or "boot" which is suitable for satisfying the invention requirements is a thermoplastic "boot" or tubing material supplied by Natvar Corporation, Woodbridge, N. J.

Although the invention has been previously described in connection with the elimination of the silver plating or undesired areas as a means of economy; nevertheless where tin plating may be preferred as opposed to silver plating, an economic advantage is still existant.

Plating tests, using the process steps described above, have proven the use of polyvinyl chloride adhesive tape as a water-tight sealant on bus-bar ends 1a, 1b between the insulating preformed tubing or "boot" 3 and the bus-bar 1 is an efficient water-tight and chemical-solution sealant.

It is to be clearly understood that the process steps of the present invention may be applicable to other electrical conductors requiring similar water-proofing, such as, for example, the sealing of plug-in openings on thermoplastic insulated bus-bars.

Although the present invention has been concerned with the utilization of thermoplastic "boot," such as, for example, polyvinyl chloride resinous material, and also the tape being of polyvinyl chloride resinous material, nevertheless the invention has broader aspects, such as using any insulation material having a sealed relation at its ends to the underlying metal bus-bar surface. For example, instead of utilizing a thermoplastic material, such as, for example, polyvinyl chloride resinous material, a suitable thermosetting material, such as epoxy resin, or polyester resin may be used as a substitute. The essential point of the invention is to provide a water-tight seal between the preformed insulating "boot" and the ends thereof, so that no liquid solution, in the plating processes, may penetrate into the annular space provided between the inside of the "boot" and the outer surface of the underlying metal bus-bar.

Figure 9:
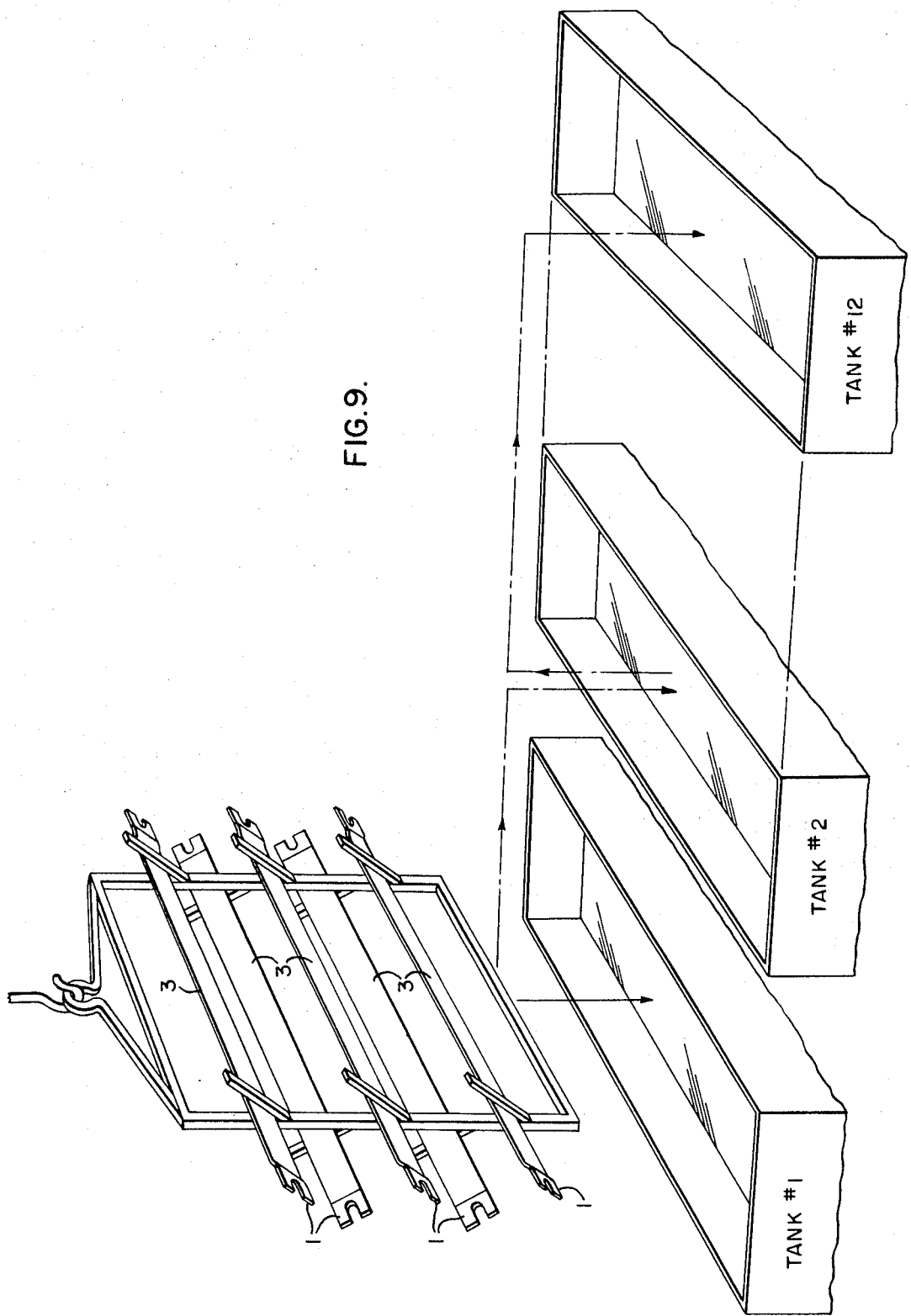

FIG. 9 illustrates somewhat diagrammatically the many tanks, or vats, which are required in silver-plating aluminum or copper bus-bars, as well known by those skilled in the art. For instance, in silver-plating an aluminum bus-bar, tank 1 would be a wash cleaning solution in hot water, vat 2 would be a cold water rinse, vat 3 would be a nitric acid dip, followed by a cold water rinse. Then a vat would provide a zincate dip for say 45 seconds. This would be followed by a cold-water spray rinse in another tank. This would be followed by a cold-water rinse. Then to provide a copper coating over the previously applied zinc coating, a copper cyanide vat would provide a copper plating of say, for example, 0.0003 inches for a 20 minute application. Then would follow a water rinse, and then a tank providing a silver cyanide solution would be used to plate a coating of, say 0.0001 inches silver on the previously coated copper coating. Another tank would reclaim the silver, and a final hot-water rinse tank would be used, in which the silver-plated bus-bar would finally be dipped to test for blisters and accelerate drying.

In regard to silver plating a copper bus-bar, instead of an aluminum bus-bar, as previously described, again there would be many vats, or tanks utilized. For example, the cleaning steps; would consist of an alkaline cleaning operation followed by water rinse, nitric-sulfuric acid dip, water rinse, immersion silver plating, reclaim silver, and finally a hot water rinse to accelerate drying of the copper bus-bars. In any event, it is to be noted that several tanks, such as approaching twelve in number, are used in the successive dipping operations. If there were penetration between the preformed "boot" and the bus-bar, the liquid solutions would tend to intermix by the carrying of the liquid solutions by the bus-bar itself. This would not only be undesirable in contaminating the several vats, but, additionally, the corrosive solutions would tend to deteriorate the metallic bus-bar portions under the preformed "boot."

Although there have been illustrated and described specific method steps and bus-bar articles, it is to be clearly understood that the same were merely for the purpose of illustration, and that plating changes and modifications on the exposed electrical conductor ends may readily be made therein by those skilled in the art, without departing from the spirit and scope of the invention.

We claim as our invention:

1. An elongated bus bar having an insulating sheath tubing of thermoplastic resinous material disposed thereabout, both ends of the insulating tubing being sealed in water-tight manner to the bare conductor surface of said elongated bus bar by insulating tape formed of a thermoplastic resinous material, whereby liquid may not penetrate between the inner bus bar and the outer sheath tubing.

2. An elongated bus bar having an insulating sheath tubing of polyvinyl chloride disposed thereabout, both ends of the insulating tubing being sealed in water-tight manner to the bare bus bar surface of said elongated bus bar by polyvinyl chloride resinous tape, whereby liquid may not penetrate between the inner bus bar and the outer sheath tubing.

3. The combination according to claim 2, wherein at least one of the taped ends of the sheath tubing is covered with additional tape for handling facility.

4. An elongated bus bar of appreciable length having an insulating preformed sheath tubing disposed thereabout and in physical contact with the bare bus bar over a substantial portion of the length thereof, adhesive means comprising polyvinyl chloride resinous tape for sealing both ends of the insulating preformed tubing in water-tight manner to the bare bus bar surface, whereby liquid may not penetrate between the inner bus bar surface and the outer preformed sheath tubing in physical contact therewith.

5. The combination of claim 4, wherein the taped ends of the sheath tubing are covered with additional tape for handling facilities.

* * * * *